(12) United States Patent
Kang et al.

(10) Patent No.: US 9,973,373 B2
(45) Date of Patent: May 15, 2018

(54) APPARATUS AND METHOD FOR MANAGING DOMAIN NAME SYSTEM SERVER IN COMMUNICATION SYSTEM

(71) Applicant: Samsung Electronics Co. Ltd., Suwon-si, Gyeonggi-do (KR)

(72) Inventors: Hyeon-Jin Kang, Seoul (KR); Sang-Jun Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 13/778,669

(22) Filed: Feb. 27, 2013

(65) Prior Publication Data

US 2013/0262676 A1 Oct. 3, 2013

(30) Foreign Application Priority Data

Apr. 3, 2012 (KR) .......................... 10-2012-0034385

(51) Int. Cl.
| | |
|---|---|
| G06F 15/16 | (2006.01) |
| H04L 12/28 | (2006.01) |
| H04L 12/24 | (2006.01) |
| H04L 29/06 | (2006.01) |
| H04L 29/12 | (2006.01) |

(52) U.S. Cl.
CPC .......... *H04L 41/00* (2013.01); *H04L 61/2015* (2013.01); *H04L 63/10* (2013.01); *H04L 63/1483* (2013.01); *H04L 61/1511* (2013.01)

(58) Field of Classification Search
CPC ........... H04L 29/0809; H04L 29/06095; H04L 29/06; H04L 12/66; H04L 29/08576; H04L 29/08072; H04L 29/06027; H04L 29/06326; H04M 7/006
USPC ........................................................ 709/247
See application file for complete search history.

(56) References Cited

U.S. PATENT DOCUMENTS

| | | | |
|---|---|---|---|
| 6,469,998 B1 * | 10/2002 | Burgaleta Salinas | H04L 29/12216 370/338 |
| 7,072,944 B2 * | 7/2006 | Lalonde | G06Q 10/107 709/206 |
| 7,620,733 B1 | 11/2009 | Tzakikario et al. | |
| 7,634,269 B2 * | 12/2009 | Gallagher | H04W 16/16 370/331 |
| 8,929,349 B2 * | 1/2015 | Park | H04W 76/02 370/338 |
| 2002/0004826 A1 * | 1/2002 | Waite | H04L 29/12066 709/223 |
| 2003/0229697 A1 * | 12/2003 | Borella | H04L 29/06 709/226 |
| 2006/0039352 A1 * | 2/2006 | Karstens | H04L 29/12066 370/352 |
| 2006/0095585 A1 * | 5/2006 | Meijs | H04L 12/4633 709/245 |
| 2006/0143703 A1 * | 6/2006 | Hopen | G06F 21/6218 726/15 |

(Continued)

Primary Examiner — Mahran Abu Roumi
(74) Attorney, Agent, or Firm — Jefferson IP Law, LLP

(57) ABSTRACT

An apparatus and a method for managing a Domain Name System (DNS) server address in a communication system are provided. In the method for operating a terminal, an attempt to change an address of a DNS server to a first address is detected. Whether the first address is included in an address list defined in advance is determined. When the first address is not included in the address list defined in advance, the change to the first address is stopped.

15 Claims, 8 Drawing Sheets

(56) References Cited

U.S. PATENT DOCUMENTS

| | | | | |
|---|---|---|---|---|
| 2007/0112911 A1* | 5/2007 | McKeeth | .......... | H04L 29/12066 709/203 |
| 2008/0062997 A1* | 3/2008 | Nix | .................. | H04L 29/12066 370/395.2 |
| 2008/0086574 A1* | 4/2008 | Raciborski | ........ | H04L 29/12066 709/245 |
| 2008/0147837 A1* | 6/2008 | Klein | ................ | H04L 29/12066 709/223 |
| 2008/0177843 A1* | 7/2008 | Gillum | ................ | G06Q 10/107 709/206 |
| 2008/0222306 A1* | 9/2008 | Bhakta | .............. | H04L 29/12066 709/245 |
| 2008/0261565 A1* | 10/2008 | Kunz | ...................... | H04W 8/12 455/414.1 |
| 2009/0292824 A1* | 11/2009 | Marashi | ............ | H04L 29/12066 709/247 |
| 2010/0009671 A1* | 1/2010 | Goldman | .............. | H04W 24/08 455/423 |
| 2010/0138525 A1* | 6/2010 | Dong | ...................... | H04W 8/20 709/222 |
| 2010/0281151 A1* | 11/2010 | Ramankutty | ......... | G06F 15/173 709/223 |
| 2010/0281157 A1* | 11/2010 | Ramankutty | ......... | H04W 24/08 709/224 |
| 2010/0290337 A1* | 11/2010 | Suvi | ...................... | H04W 12/08 370/217 |
| 2011/0082931 A1* | 4/2011 | Wang | ................ | H04L 29/12066 709/224 |
| 2011/0153840 A1* | 6/2011 | Narayana | ............ | H04L 67/1029 709/227 |
| 2011/0158160 A1* | 6/2011 | McCullough | ......... | H04W 40/02 370/328 |
| 2012/0094648 A1* | 4/2012 | Fan | ....................... | H04W 4/021 455/422.1 |
| 2012/0096166 A1* | 4/2012 | Devarapalli | ........ | H04L 61/1511 709/226 |
| 2012/0124229 A1* | 5/2012 | Sahu | ..................... | H04W 76/02 709/228 |
| 2012/0252493 A1* | 10/2012 | Siddeley | .................. | H04W 4/02 455/456.2 |
| 2012/0307656 A1* | 12/2012 | Vyrros | ................ | H04L 12/1859 370/252 |
| 2013/0247183 A1* | 9/2013 | Kumar | .................. | G06F 21/554 726/22 |

\* cited by examiner

APPARATUS AND METHOD FOR MANAGING DOMAIN NAME SYSTEM SERVER IN COMMUNICATION SYSTEM

PRIORITY

This application claims the benefit under 35 U.S.C. § 119(a) of a Korean patent application filed on Apr. 3, 2012 in the Korean Intellectual Property Office and assigned Serial No. 10-2012-0034385, the entire disclosure of which is hereby incorporated by reference.

BACKGROUND OF THE INVENTION

1. Field of the Invention

The present invention relates to a Domain Name System (DNS). More particularly, the present invention relates to an apparatus and method for managing an address of a DNS server.

2. Description of the Related Art

In an Internet Protocol (IP) network, each node or point has a unique IP address. Since the IP address is configured using a combination of numbers, it is not easy to memorize and is difficult to identify. Therefore, a user uses a Uniform Resource Locator (URL) instead of the IP address. In this regard, the DNS server informs of a URL corresponding to the IP address. The DNS server may be operated as a private server but, in case of a public communication network, the DNS server is typically provided by a relevant communication company.

Since the DNS server is a node inside an IP network, it has an IP address. The IP address of the DNS server may be manually designated by a user or may be allocated during a process in which the user is allocated an IP address via a Dynamic Host Configuration Protocol (DHCP). Accordingly, a User Equipment (UE) may be provided with an IP address for a specific URL from the DNS server. At this point, in the case where a DNS server established by an ill-intended purpose exists and the UE is provided with a false IP address via the ill-intended DNS server, the UE may access a site not intended by the user. For example, an IP address of the Korean Intellectual Property Office 'www.kipo.go.kr' is '152.99.202.101'. A normal DNS server provides '152.99.202.101' for 'www.kipo.go.kr'. However, in the case where an ill-intended DNS server provides a different IP address intentionally, a user may access a site totally different from the desired URL. In this case, information such as a user Identifier (ID), a password, etc., may be stolen.

As described above, in case of using an ill-intended DNS server, a user may access an undesired site and personal information may be stolen. Therefore, a need exists for preventing access to an ill-intended DNS server.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for managing an address of a Domain Name System (DNS) server in a communication system.

Another aspect of the present invention is to provide an apparatus and a method for preventing an access to an ill-intended DNS server in a communication system.

In accordance with an aspect of the present invention, a method for operating a terminal in a communication system is provided. The method includes detecting an attempt to change an address of a DNS server that is in use for DNS query to a first address, determining whether the first address is included in an address list defined in advance, and, when the first address is not included in the address list defined in advance, stopping the change to the first address.

In accordance with another aspect of the present invention, an apparatus of a terminal in a communication system is provided. The apparatus includes at least one processor, and a memory for storing a module configured for being executable by the at least one processor, wherein the module includes at least one instruction for detecting an attempt to change an address of a DNS server that is in use for DNS query to a first address, for determining whether the first address is included in an address list defined in advance, and for, when the first address is not included in the address list defined in advance, stopping the change to the first address.

In accordance with yet another aspect of the present invention, an apparatus of a terminal in a communication system is provided. The apparatus includes a controller for detecting an attempt to change an address of a DNS server that is in use for DNS query to a first address, for determining whether the first address is included in an address list defined in advance, and for, when the first address is not included in the address list defined in advance, stopping the change to the first address.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to an apparatus and method for preventing access to an ill-intended DNS server. Exemplary embodiments of the present invention provide a technology for managing an address of a Domain Name System (DNS) server in a communication system.

Figure 1:
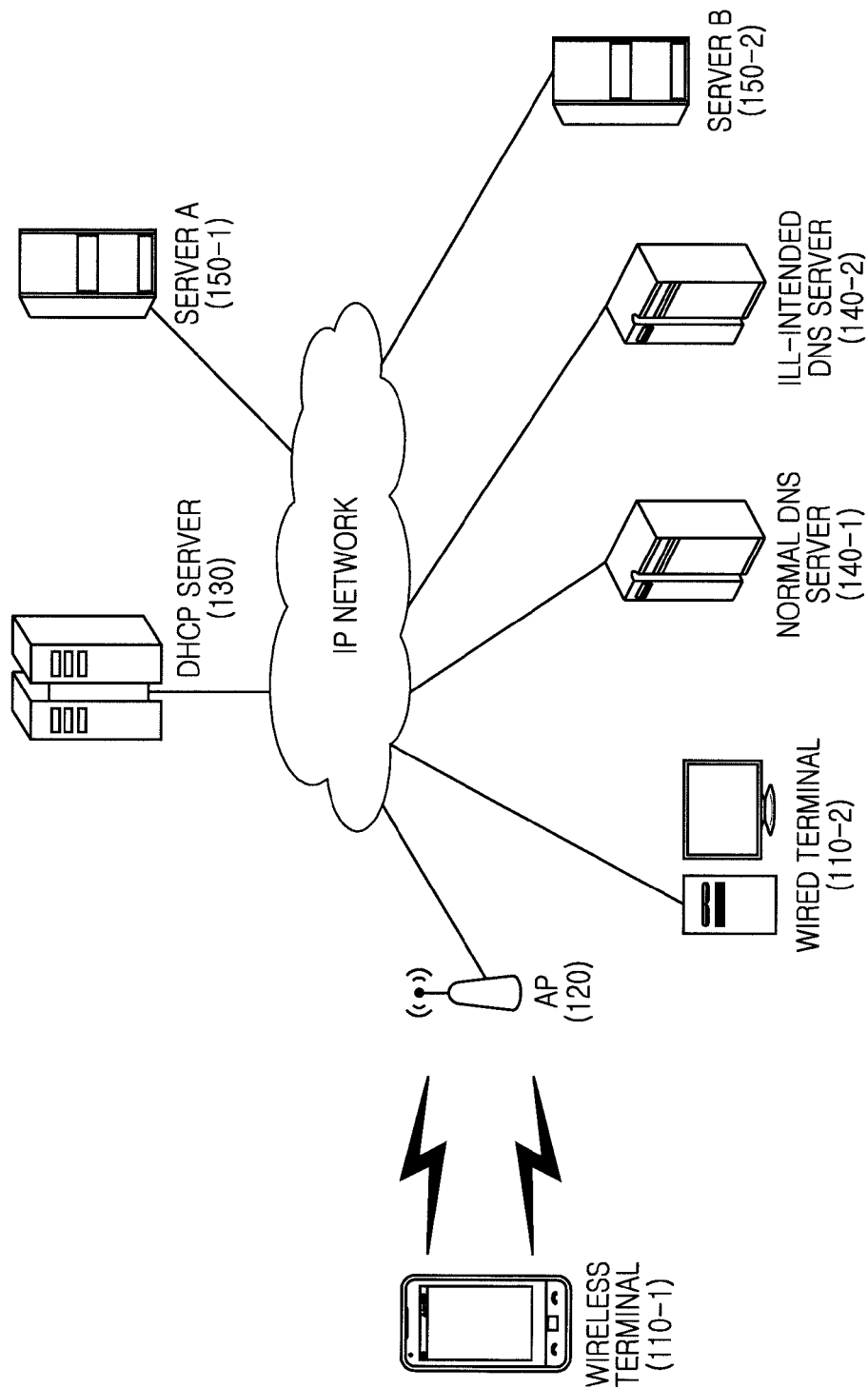
FIG. 1 is a schematic view illustrating a communication system environment according to an exemplary embodiment of the present invention.

FIG. 1 schematically illustrates a communication system environment according to an exemplary embodiment of the present invention.

Referring to FIG. 1, the communication system includes a wireless terminal 110-1, a wired terminal 110-2, an Access Point (AP) 120, a Dynamic Host Configuration Protocol (DHCP) server 130, a normal DNS server 140-1, an ill-intended DNS server 140-2, a server A 150-1, and a server B 150-2.

The wireless terminal 110-1 and the wired terminal 110-2 are User Equipment (UE). The wireless terminal 110-1 may access an Internet Protocol (IP) network via a wireless connection with the AP 120. The wired terminal 110-2 may access the IP network via a wired interface. The wireless terminal 110-1 may be a portable electronic device. More specifically, the wireless terminal 110-1 may be one of a smart phone, a portable terminal, a mobile phone, a mobile pad, a media player, a tablet computer, a handheld computer, a Personal Digital Assistant (PDA), and the like. Also, the wireless terminal 110-1 may be a device that combines two or more functions among the above devices.

The DHCP server 130 is a node for allocating a dynamic IP address to the wireless terminal 110-1 and the wired terminal 110-2, and may provide an address of a DNS server together with dynamic IP allocation. The normal DNS server 140-1 is a DNS server that guarantees safety, and the ill-intended DNS server 140-2 is a DNS server of an ill-intended purpose, providing a false IP address. Preferably, the DHCP server 130 provides an address of the normal DNS server 140-1 as a DNS server address. However, in the case where the DHCP server 130 is manipulated by a person having an ill-intended purpose, the DHCP server 130 may provide an address of the ill-intended DNS server 140-2 to the terminals 110-1 and 110-2.

The server A 150-1 is a server providing a web page having a reasonable right to use a specific Uniform Resource Locator (URL) (referred to as 'URL_A', hereinafter). The server B 150-2 is a server providing a web page having nothing to do with URL_A. A web page provided by the server B 150-2 may be produced for an ill-intended purpose for deceiving a user who accesses URL_A, or may have nothing to do with URL_A. Therefore, in the case where the terminals 110-1 and 110-2 question the normal DNS server 140-1 on an IP address corresponding to URL_A, the normal DNS server 140-1 provides an IP address of the server A 150-1. Accordingly, the terminals 110-1 and 110-2 may reasonably access the server A 150-1. However, in the case where the terminals 110-1 and 110-2 question the ill-intended DNS server 140-2 on an IP address corresponding to the URL_A, the ill-intended DNS server 140-2 provides an IP address of the server B 150-2, not the server A 150-1. Consequently, the terminals 110-1 and 110-2 access an unintended different web page.

As described above, a danger that the terminals 110-1 and 110-2 may access a false node exists, which is caused by use of an address of the ill-intended DNS server. To prevent this, exemplary embodiments of the present invention propose a DNS server address management technique as illustrated in FIGS. 2 to 5. An exemplary embodiment of the present invention described with reference to FIGS. 2 to 5 may be performed by the wireless terminal 110-1 or the wired terminal 110-2. FIGS. 2 to 5 illustrate a logic functional block for performing an exemplary embodiment of the present invention among construction of a terminal.

Figure 2:
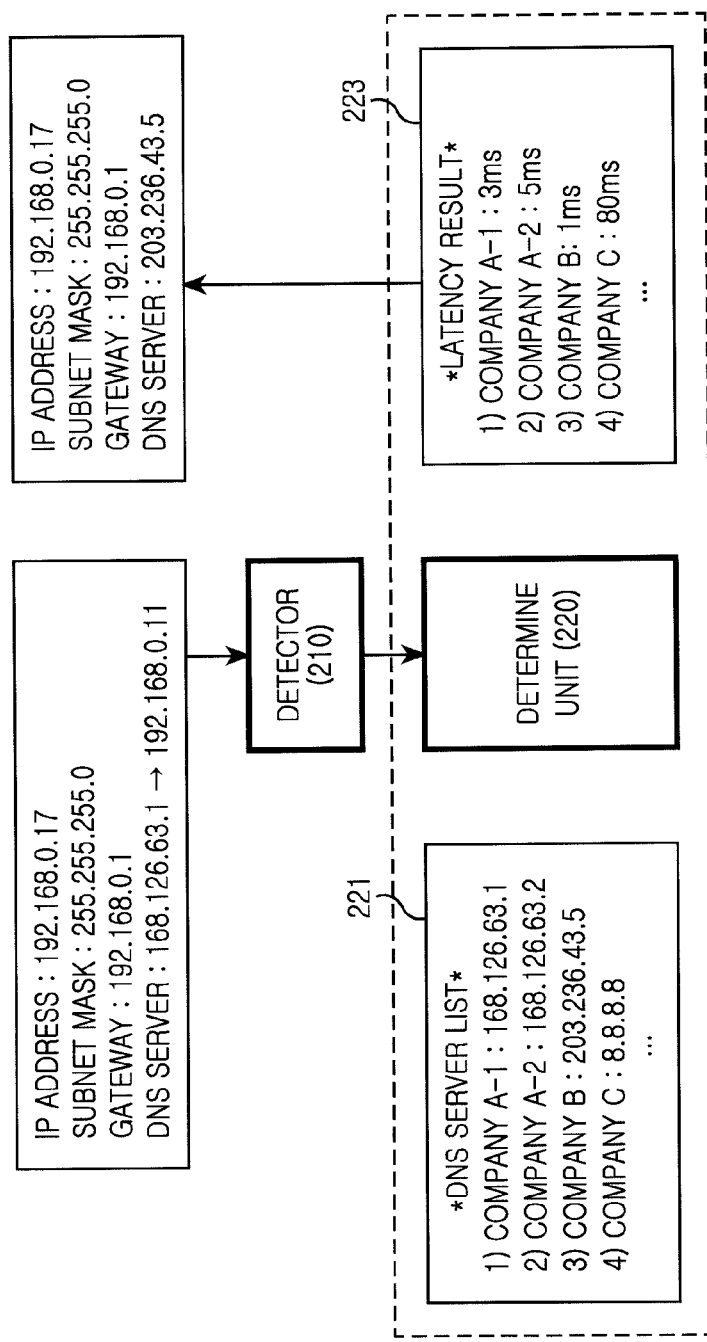
FIG. 2 is a block diagram illustrating management of a Domain Name System (DNS) server address in a communication system according to an exemplary embodiment of the present invention.

FIG. 2 is a block diagram illustrating management of a DNS server address in a communication system according to an exemplary embodiment of the present invention.

Referring to FIG. 2, an address of a preferred DNS server is set to '168.126.63.1', and an attempt is made to change the address to '192.168.0.11.' Here, the address of the preferred DNS server denotes an address of a DNS server used when the terminal performs DNS query. That is, the address of the preferred DNS server may be denoted by a 'DNS server address for DNS query' or a 'DNS server address in use'. Also, the requested DNS server, that is, the DNS server having an address of '192.168.0.11' is denoted by a 'requested DNS server'. An attempt to change the address of the DNS server may be performed by a user's instruction, provided from a DHCP server, or by execution of a specific program.

A detector 210 detects the attempt to change the preferred DNS server, postpones application of the change, and informs a determine unit 220 of the attempt to change the preferred DNS server. The determine unit 220 determines whether a requested DNS server, which is the subject of the attempted change, is safe. For example, the determine unit 220 may determine whether it possesses or otherwise has access to a DNS server list 221, which includes a list of DNS servers that are considered safe, and whether the requested DNS server is included in the list 221. At this point, since the requested DNS server is not included in the list 221, the determine unit 220 determines that the requested DNS server is not safe.

The determine unit 220 that has determined that the requested DNS server is not safe selects a DNS server that is included in the list 221 and is therefore considered safe. The selection of the DNS server that is included in the list 221 may change depending on exemplary embodiments of the present invention. For example, as illustrated in FIG. 2, the determine unit 220 may select the DNS server based on latency, using a latency result 223. In addition, the determine unit 220 registers an address of a selected DNS server, not the requested DNS server. In the example of FIG. 2, the determine unit 220 selects the DNS server with an address of '203.236.43.5' that is associated with company B and has the lowest latency.

Figure 3:
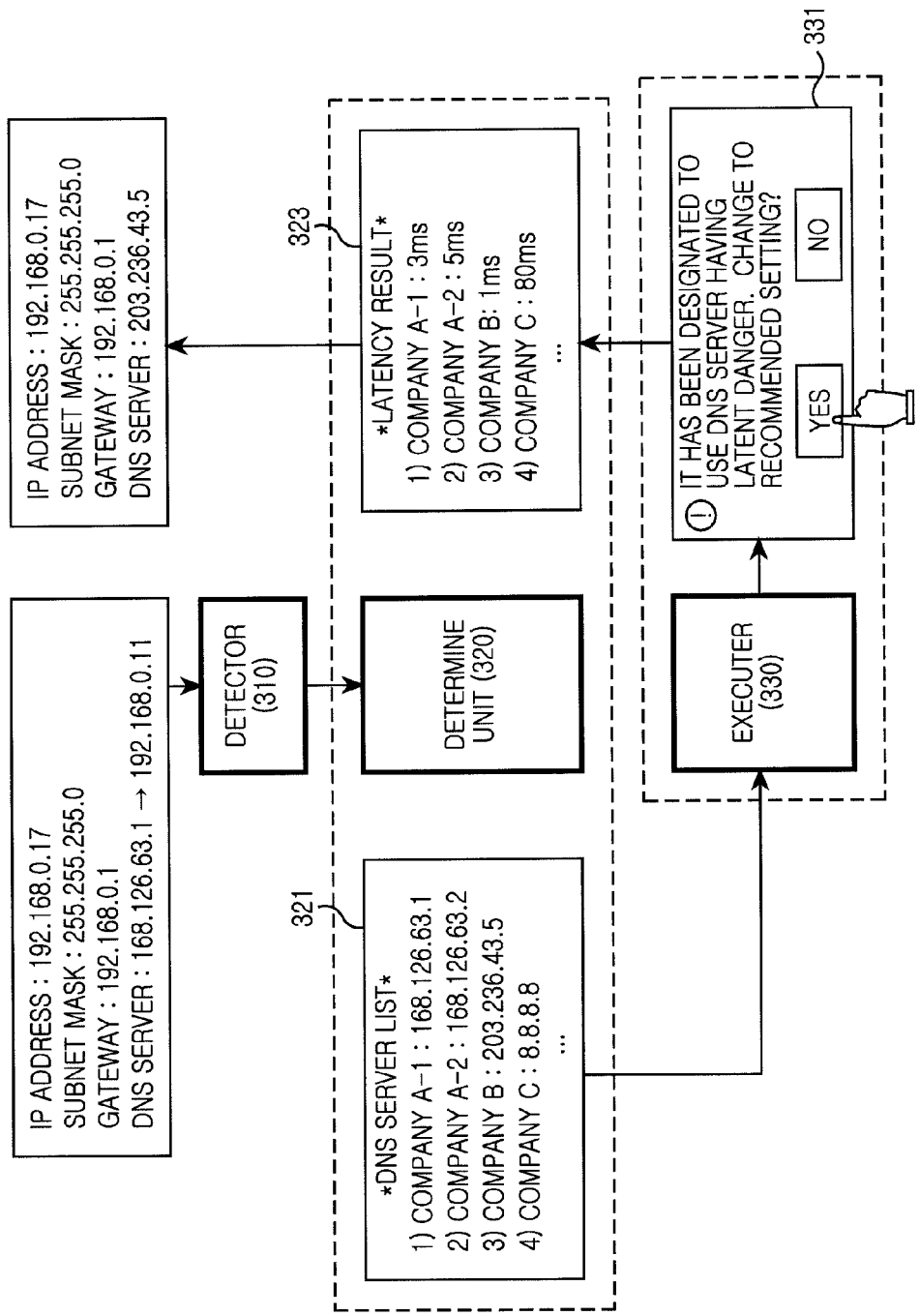
FIG. 3 is a block diagram illustrating management of a DNS server address in a communication system according to an exemplary embodiment of the present invention.

FIG. 3 is a block diagram illustrating management of a DNS server address in a communication system according to an exemplary embodiment of the present invention.

Referring to FIG. 3, an address of a preferred DNS server is set to '168.126.63.1' and a change to '192.168.0.11' is attempted. The attempted change of the address of the preferred DNS server may be performed by a user's instruction, provided from a DHCP server, or by execution of a specific program.

A detector 310 detects the attempt to change the preferred DNS server, postpones application of the change, and informs a determine unit 320 of the attempt to change the preferred DNS server. The determine unit 320 determines whether the requested DNS server is safe. For example, the determine unit 320 determines whether it possesses or otherwise has access to a DNS server list 321, which includes a list of DNS servers that are considered safe, and whether the requested DNS server is included in the list 321. At this point, since the requested DNS server is not included in the list 321, the determine unit 320 determines that the requested DNS server is not safe.

The determine unit 320 informs an executor 330 that the requested DNS server is not safe. Based on this information, the executor 330 may display a warning 331 to a user. In an exemplary implementation, the warning 331 questions whether the user would prefer to change to a recommended DNS server because the requested DNS server is not safe. At this point, it is assumed that the user selects 'YES', that is, selects to change to the recommended DNS server. In this case, the executor 330 informs the determine unit 320 that the setting is changed to the recommended DNS server, not the requested DNS server.

The determine unit 320 selects one of the safe DNS servers that is included in the list 321. A reference of the selection may change depending on a specific exemplary embodiment of the present invention. For example, as illustrated in FIG. 3, the determine unit 320 may select the DNS server based on latency, using a latency result 323. In addition, the determine unit 320 registers an address of a selected DNS server, not the requested DNS server, as an address of a DNS server to use. In the example of FIG. 3, the determine unit 320 selects the DNS server with an address of '203.236.43.5' that is associated with company B and has the lowest latency.

Figure 4:
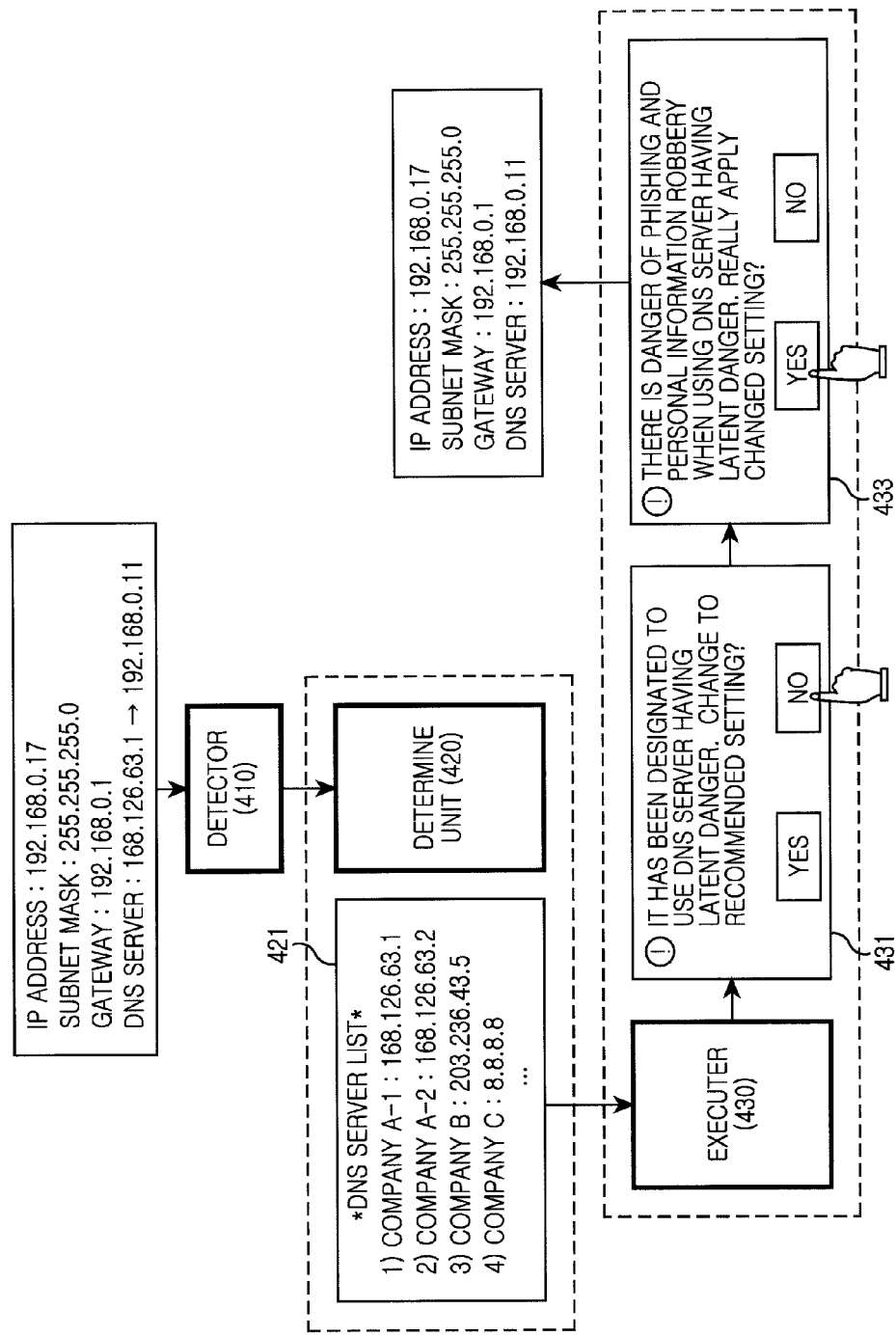
FIG. 4 is a block diagram illustrating management of a DNS server address in a communication system according to an exemplary embodiment of the present invention.

FIG. 4 is a block diagram illustrating management of a DNS server address in a communication system according to an exemplary embodiment of the present invention.

Referring to FIG. 4, an address of a preferred DNS server is set to '168.126.63.1' and a change to '192.168.0.11' is attempted. The attempted change of the address of the preferred DNS server may be performed by a user's instruction, provided from a DHCP server, or by execution of a specific program.

A detector 410 detects the attempt to change the preferred DNS server, postpones application of the change, and informs a determine unit 420 of the attempt to change the preferred DNS server. The determine unit 420 determines whether the requested DNS server is safe. For example, the determine unit 420 determines whether it possesses or otherwise has access to a DNS server list 421, which includes a list of DNS servers that are considered safe, and whether the requested DNS server is included in the list 421. At this point, since the requested DNS server is not included in the list 421, the determine unit 420 determines that the requested DNS server is not safe.

The determine unit 420 informs an executor 430 that the requested DNS server is not safe. Based on this information, the executor 430 may display a warning 431 to a user. In an exemplary implementation, the warning 431 questions whether the user would prefer to change to a recommended DNS server because the currently requested DNS server is not safe. At this point, unlike the exemplary embodiment described with reference to FIG. 3, the exemplary embodiment illustrated in FIG. 4 performs a double confirm procedure. That is, referring to FIG. 4, the user has selected to change to the requested DNS server and accordingly, the executor 430 displays a second warning 433 for confirming the user's intention. At this point, it is assumed that the user selects 'YES', that is, selects to change to the requested DNS server. In this case, the executor 430 registers an address of the requested DNS server.

Figure 5:
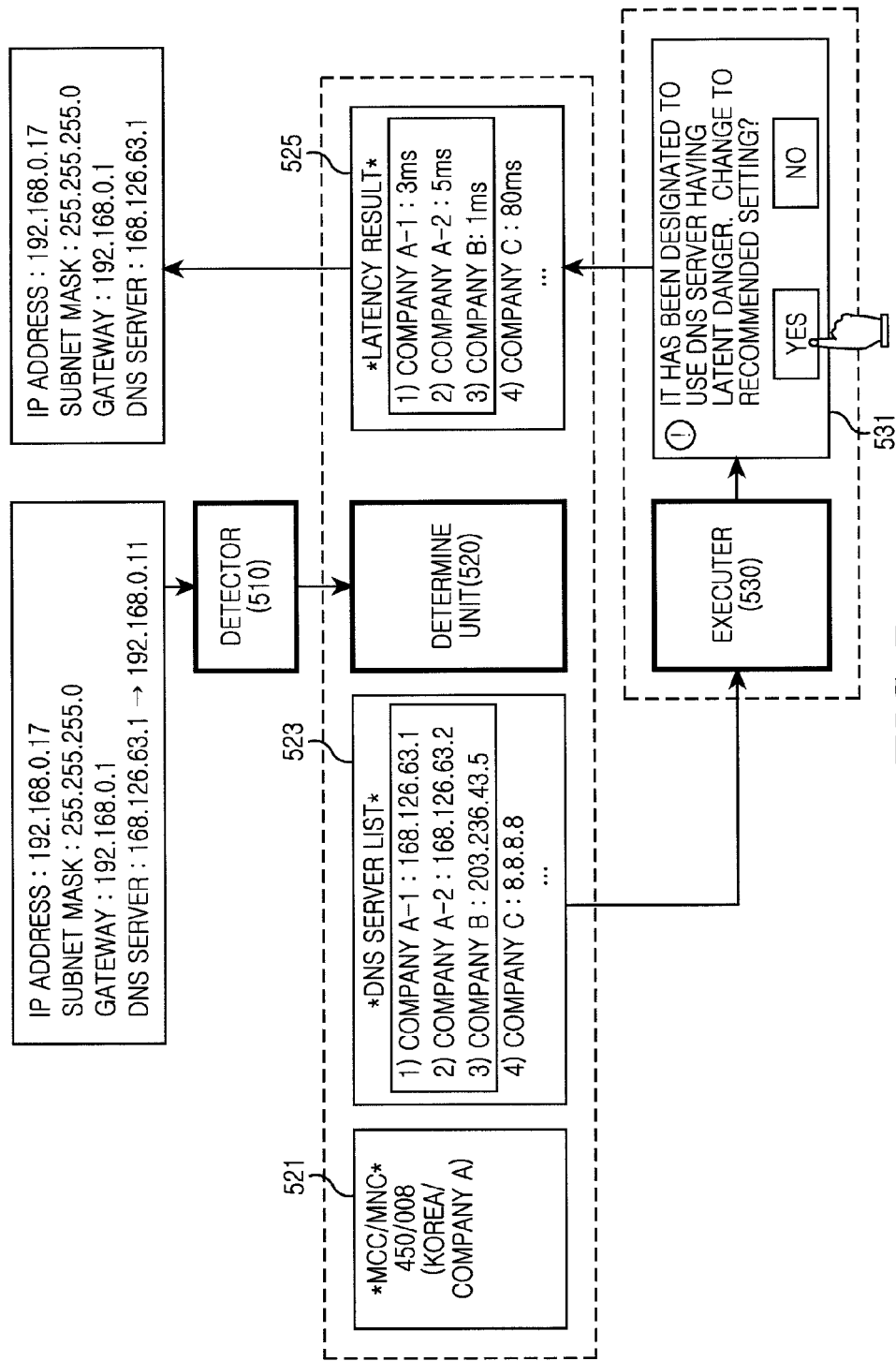
FIG. 5 is a block diagram illustrating management of a DNS server address in a communication system according to an exemplary embodiment of the present invention.

FIG. 5 is a block diagram illustrating management of a DNS server address in a communication system according to an exemplary embodiment of the present invention.

Referring to FIG. 5, an address of a registered DNS server is set to '168.126.63.1' and a change to '192.168.0.11' is attempted. The attempted change of the address of the DNS server may be performed by a user's instruction, provided from a DHCP server, or by execution of a specific program.

A detector 510 detects the attempt to change the preferred DNS server, postpones application of the change, and informs a determine unit 520 of the attempt to change the preferred DNS server. The determine unit 520 determines whether the requested DNS server is safe. For example, the determine unit 520 determines whether it possesses or otherwise has access to a DNS server list 523, which includes a list of DNS servers that are considered safe, and whether the requested DNS server is included in the list 523. At this point, since the requested DNS server is not included in the list 523, the determine unit 520 determines that the requested DNS server is not safe.

The determine unit 520 informs an executor 530 that the requested DNS server is not safe. Based on this information, the executor 530 may display a warning 531 to a user. In an exemplary implementation, the warning 531 questions whether the user would prefer to change to a recommended DNS server because the currently requested DNS server is not safe. At this point, it is assumed that the user selects 'YES', that is, selects to change to the recommended DNS server. In this case, the executor 530 informs the determine unit 520 that the setting is changed to the recommended DNS server, not the requested DNS server.

The determine unit 520 selects one of the safe DNS servers that is included in the list 523. A reference of the selection may change depending on a specific exemplary embodiment of the present invention. For example, the determine unit 520 may select the DNS server based on latency, using a latency result 525. In the example of FIG. 5, a DNS server of a company B has a minimum latency. However, when a plurality of subscribers of a company A designate a DNS server of the company B which is a DNS server having a minimum delay rate, the company B processes the DNS query of the subscribers of the different company, so that an unreasonable result may occur. Therefore, in the case of the exemplary embodiment illustrated in FIG. 5, the determine unit 520 uses subscriber information 521 in addition to the latency in order to select the DNS server. When information stored in a Universal Subscriber Identity Module (USIM) provided in a terminal is used, a company to which the terminal has subscribed is determined. For example, a Mobile Country Code (MCC) value and a Mobile Network Code (MNC) value may be used. At this point, it is assumed that the terminal is a subscriber of the company A. Accordingly, though a DNS server of the company B has a minimum latency, the determine unit 520 selects a DNS server from among DNS servers of the company A. In addition, the determine unit 520 registers an address of the selected DNS server, not the requested DNS server. In the example of FIG. 5, the determine unit 520 selects the DNS server with an address of '168.126.63.1' having a minimum latency among the DNS servers of the company A.

Hereinafter, an exemplary operation and construction of a terminal for managing a DNS server address is described with reference to the accompanying drawings.

Figure 6:
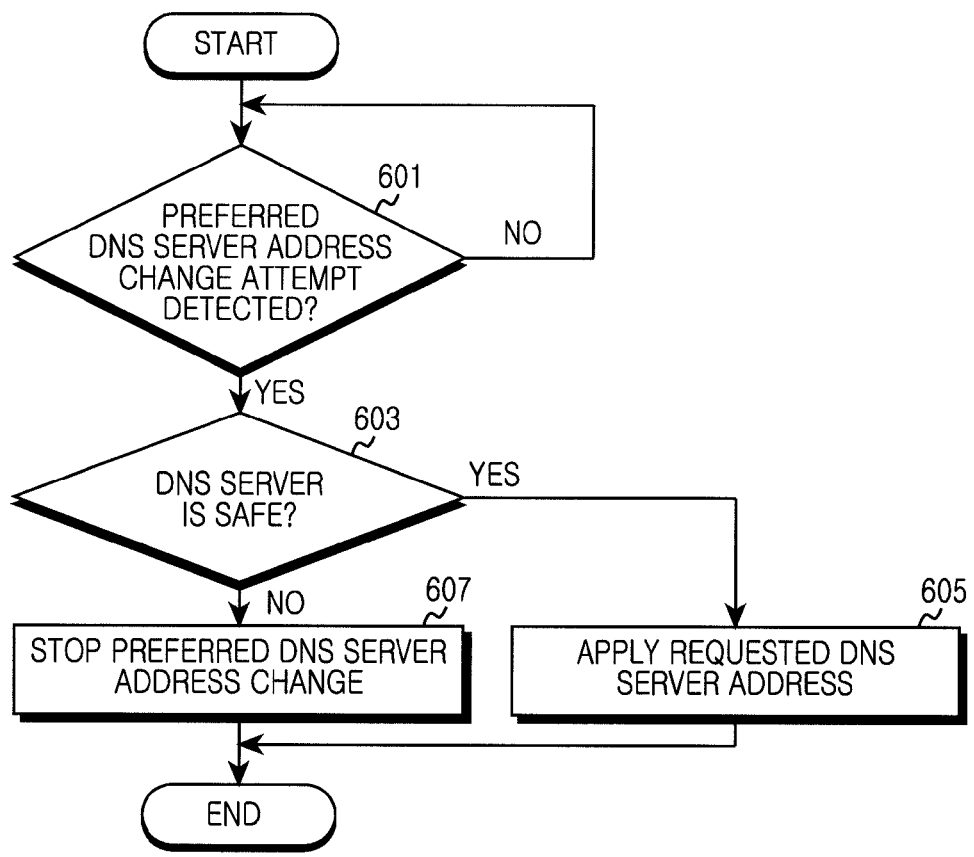
FIG. 6 is a flowchart illustrating a procedure for operating a terminal in a communication system according to an exemplary embodiment of the present invention.

FIG. 6 is a flowchart illustrating a procedure for operating a terminal in a communication system according to an exemplary embodiment of the present invention.

Referring to FIG. 6, the terminal determines whether a change of a preferred DNS server address is attempted in step 601. The change of the preferred DNS server address may be attempted by a user's change or by execution of a specific program, or a DNS server address different from the current setting may be provided from a DHCP server.

When the change of the preferred DNS server address is attempted, the terminal proceeds to step 603 to determine whether the requested DNS server is a DNS server that is safe. In other words, the terminal postpones change of the preferred DNS server address and determines the safety of the requested DNS server. For example, the terminal may determine the safety based on whether the requested DNS server is included in a list of safe DNS servers stored in advance. According to another exemplary embodiment of the present invention, the terminal may question the safety of the DNS server using an external device via a communication network.

When determining that the requested DNS server is safe, the terminal proceeds to step 605 to apply an address of the requested DNS server. In other words, the terminal registers the address of the requested DNS server as an address of the DNS server which will transmit a DNS query. Accordingly, when a URL is input from the user afterward, the terminal questions the DNS server on an IP address corresponding to the URL.

On the contrary, when determining that the requested DNS server is not safe, the terminal proceeds to step 607 to stop changing of the preferred DNS server. In other words, the terminal does not change the preferred DNS server to the requested DNS server. In addition, according to an exemplary embodiment of the present invention, the terminal may change the preferred DNS server address to an address of a recommended DNS server that is considered safe. For example, in the case where a list of a plurality of recommended DNS servers that are safe is possessed, the terminal selects one of the plurality of recommended DNS servers. At this point, the selection by the terminal may be based on at least one of latency regarding the recommended DNS servers and information of a company to which a subscriber of the terminal has subscribed. According to another exemplary embodiment of the present invention, the terminal may maintain an address of a DNS server registered before an attempted change of the preferred DNS server address. That is, stopping the changing of the preferred DNS server denotes maintaining a current preferred DNS server address or changing to an address of one of the plurality of recommended DNS servers.

Figure 7:
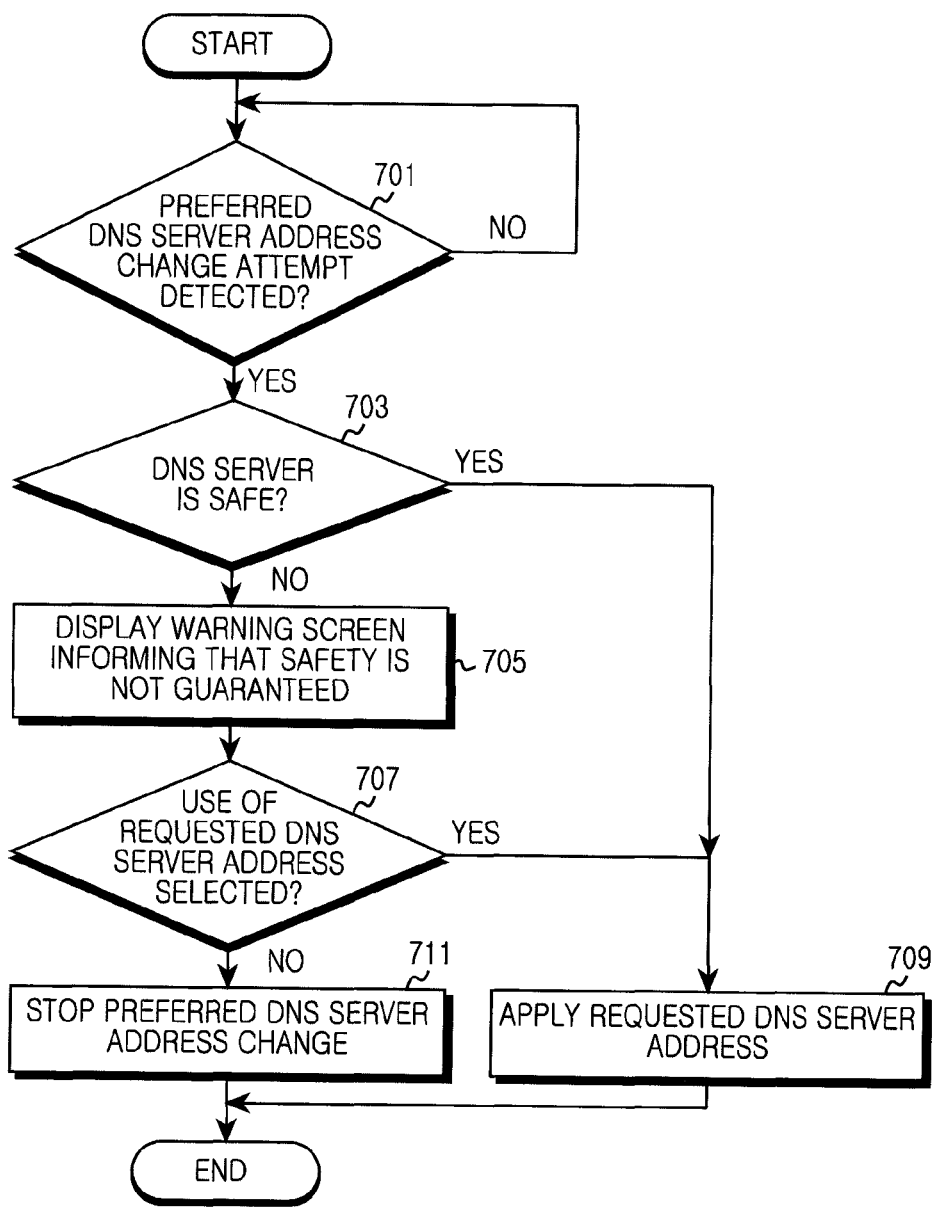
FIG. 7 is a flowchart illustrating a procedure for operating a terminal in a communication system according to an exemplary embodiment of the present invention.

FIG. 7 is a flowchart illustrating a procedure for operating a terminal in a communication system according to another exemplary embodiment of the present invention.

Referring to FIG. 7, the terminal determines whether a change of a preferred DNS server address is attempted in step 701. The change of the preferred DNS server address may be attempted by a user's change or by execution of a specific program, or a DNS server address different from the current setting may be provided from a DHCP server.

When the change of the preferred DNS server address is attempted, the terminal proceeds to step 703 to determine whether the requested DNS server is a DNS server that is safe. In other words, the terminal postpones the change of the preferred DNS server address and determines the safety of the requested DNS server. For example, the terminal may determine the safety based on whether the requested DNS server is included in a list of safe DNS servers stored in advance. According to another exemplary embodiment of the present invention, the terminal may question the safety of the DNS server using an external device via a communication network. When determining that the requested DNS server is safe, the terminal proceeds to step 709.

On the contrary, when determining that the requested DNS server is not safe, the terminal proceeds to step 705 to display a warning screen informing that safety is not guaranteed. The warning screen includes at least one of a phrase saying that the requested DNS server does not guarantee safety, and a phrase questioning whether to use a recommended DNS server.

The terminal proceeds to step 707 to determine a user's selection. That is, the terminal determines whether the user selects to use the address of the requested DNS server. At this point, the warning and select confirm operations of step 705 and step 707 may be repeatedly performed in order to secure reliability of the user's selection. That is, in the case where the user selects to use an address of the requested DNS server, the terminal may display a second warning and re-confirm the user's intention.

When the user selects to use the requested DNS server address, the terminal proceeds to step 709 to apply the address of the requested DNS server. In other words, the terminal registers the address of the requested DNS server as an address of a DNS which will transmit a DNS query. Accordingly, when a URL is input from the user afterward, the terminal questions the requested DNS server on an IP address corresponding to the URL.

On the contrary, when the user selects not to use the requested DNS server address, the terminal proceeds to step 711 to stop the changing of the preferred DNS server. In other words, the terminal does not change the preferred DNS server to the requested DNS server. In addition, according to an exemplary embodiment of the present invention, the terminal may change the preferred DNS server address to an address of a recommended DNS server that is safe. For example, in the case where a list of a plurality of recommended DNS servers that are safe is possessed, the terminal selects one of the plurality of recommended DNS servers. At this point, the terminal may be based on at least one of latency regarding the recommended DNS servers and information of a company to which a subscriber of the terminal has subscribed. According to another exemplary embodiment of the present invention, the terminal may maintain an address of a DNS server registered before an attempted change of the preferred DNS server address. That is, stopping the changing of the preferred DNS server denotes maintaining a current preferred DNS server address or changing to an address of one of the plurality of recommended DNS servers.

The method described above in relation with FIG. 7 under of the present invention may be provided as one or more instructions in one or more software modules, or computer programs stored in an electronic device including a portable terminal.

The present invention may be implemented in an electronic device including a portable terminal such as, for example, a smart phone and a mobile telecommunication terminal. Hereunder, a terminal is used as an example for the electronic device.

Figure 8:
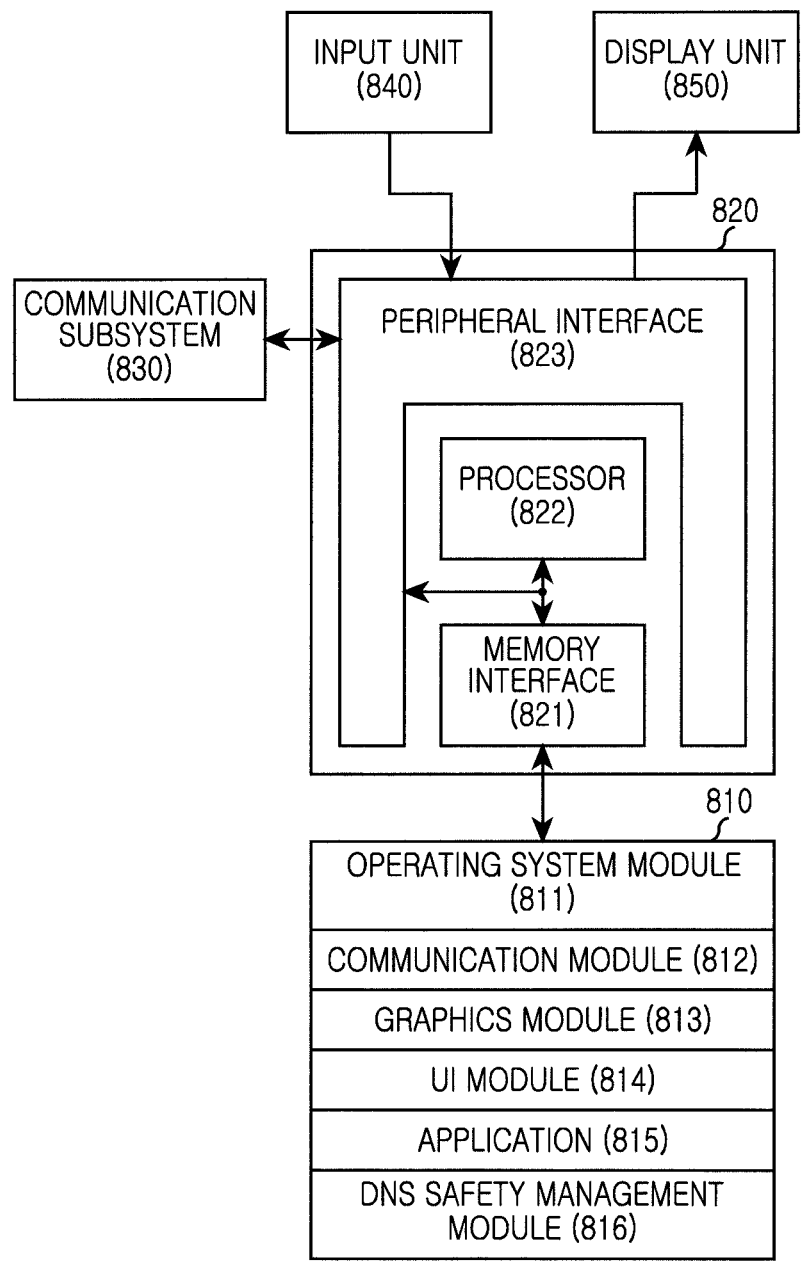
FIG. 8 is a block diagram illustrating a terminal in a communication system according to an exemplary embodiment of the present invention.

FIG. 8 is a block diagram illustrating a terminal in a communication system according to an exemplary embodiment of the present invention.

As illustrated in FIG. 8, the terminal includes a memory 810, a controller 820, a communication subsystem 830, an input unit 840, and a display unit 850. Elements of the terminal illustrated in FIG. 8 may be coupled by at least one communication bus (reference numeral not shown) or at least one stream line (reference numeral not shown).

The memory 810 may include at least one of a high speed random access memory such as at least one magnetic disk storage device, a non-volatile memory, at least one optical storage device, and a flash memory (for example, NAND, NOR). The memory 810 stores software. A software element may include an operating system module 811, a communication module 812, a graphics module 813, a user interface module 814, at least one application module 815, etc. More particularly, according to an exemplary embodiment of the present invention, the software element includes a DNS safety management module 816. A module which is a software element may be expressed as a set of instructions, and the module may be denoted by an 'instruction set' or a 'program'. At least one module including instructions for performing the method according to an exemplary embodiment of the present invention may be stored in the memory 810.

The operating system module 811 includes at least one software element for controlling a general system operation. For example, the operating system module 811 may be WINDOWS, LINUX, Darwin, RTXC, UNIX, OS X, or a built-in operating system such as VxWorks. The communication module 812 includes at least one software element for performing communication with a different device such as a computer, a server, a portable terminal, etc. via the communication subsystem 830, or accessing an IP network. The graphics module 813 includes at least one software element for providing and displaying graphics on the display unit 850. The user interface module 814 includes at least one software element regarding a user interface. The application module 815 includes at least one application. For example, the application module 815 may include a web browser. The memory 810 may include an additional module besides the above modules 811 to 815. Alternatively, according to an exemplary embodiment of the present invention, a portion of the above modules 811 to 816 may be excluded.

The DNS safety management module 816 detects that a change to an address of a DNS server that does not guarantee safety is tried, and includes at least one instruction for controlling to use a recommended DNS server guaranteeing safety. For example, the DNS safety management module 816 may include at least one instruction for allowing the terminal to perform a procedure of FIG. 6 or FIG. 7. Specifically, the DNS safety management module 816 includes at least one instruction defined to determine whether a change of a preferred DNS server address is tried, determine whether a requested DNS server is a DNS server that is safe, test safety of the requested DNS server, display a warning screen informing that safety is not guaranteed, and apply the requested DNS server address or apply a recommended DNS server address. According to another exemplary embodiment of the present invention, an instruction for displaying the warning screen may be excluded.

Here, to determine whether the requested DNS server is safe, the DNS safety management module 816 may include an instruction for determining whether the requested DNS server is included in the list of the DNS servers that are safe stored in advance, or an instruction for questioning safety of the requested DNS server using an external device via a communication network. To apply the recommended DNS server address, the DNS safety management module 816 may include an instruction for selecting one of the plurality of recommended DNS servers. At this point, the selecting of one of the plurality of recommended DNS servers may be performed based on at least one of latency and information of a company to which a subscriber of the terminal has subscribed. Alternatively, to apply the recommended DNS server address, the DNS safety management module 816 may include an instruction for maintaining an address of a DNS server registered before an attempted change of the preferred DNS server address.

The controller 820 may include a memory interface 821, a processor 822, and a peripheral interface 823. The processor 822 may include at least one hardware chip. Depending on implementation, the entire controller 820 may be denoted by a 'processor'. The memory interface 821, the processor 822, and the peripheral interface 823 may be separate elements, respectively, or may be included in at least one integrated circuit.

The processor 822 allows the terminal to perform a function corresponding to a software program by executing the software program and performs a process and a control for voice communication and data communication. Also, the processor 822 performs a specific function corresponding to a relevant software module by executing the software module stored in the memory 810. The software module may be denoted by an 'instruction set'. That is, the processor 822 performs a method according to an exemplary embodiment of the present invention in cooperation with software modules stored in the memory 810. The processor 822 may include at least one data processor, and an image processor. The data processor and the image processor may be configured using separate hardware. Also, the processor 822 may include a plurality of processors for performing different functions.

The processor 822 may also include a circuit designed to perform a specific function. For example, the processor 822 may include one of a Field Programmable Gate Array (FPGA), Application Specific Integrated Circuits (ASIC), a Programmable Logic Device (PLD), and a Digital Signal Processor (DSP). According to an exemplary embodiment of the present invention, the processor 822 may include a chip that implements a function of the DSN safety management module 816 in a hardware manner.

The peripheral interface 823 connects the Input/Output (I/O) subsystem 840 of the terminal and at least one peripheral device to the processor 821 and the memory 810. The memory 810 may be connected via the memory interface 821. That is, the memory interface 821 provides an interface for accessing the memory 810.

The communication subsystem 830 provides an interface for communication. According to an exemplary embodiment of the present invention, the communication subsystem 830 may provide a function for wireless communication. In this case, the communication subsystem 830 may include an antenna, a Radio Frequency (RF) receiver/transmitter, etc. According to an exemplary embodiment of the present invention, the communication subsystem 830 may provide a function for wired communication. In this case, the communication subsystem 830 may include a cable connection terminal, a signal receiver/transmitter, etc.

The input unit 840 detects an input generated by a user and provides information corresponding to an input to the controller 810. That is, the input unit 840 processes the user's input via a keyboard, a keypad, a touchscreen, a touchpad, a mouse, a specific function button, etc. The display unit 850 displays state information generated during an operation of the terminal, numbers, letters, images, etc., generated during execution of an application. That is, the display unit 850 expresses image data provided from the controller 810 such that the image data may be recognizable visually. For example, the display unit 850 may be a Liquid Crystal Display (LCD), a Light Emitting Polymer Display (LPD), an Organic Light Emitting Diode (OLED), an Active Matrix Organic Light Emitting Diode (AMOLED), a Flexible LED (FLED), etc. According to an exemplary embodiment of the present invention, the input unit 840 and the display unit 850 may be configured as one unit in the form of a touchscreen. In this case, the input unit 840 and the display unit 850 may include a control means for detecting a contact, a movement, and stoppage of the contact or the movement using a multi-touch sensing technology including other proximity sensor arrangements or other elements as well as capacitive, resistive, infrared, and surface acoustic wave technologies for determining at least one contact point on the screen.

Methods according to exemplary embodiments described in the claims and/or specification of the present invention may be implemented in hardware, software, or a combination of hardware and software.

In case of implementation in software, a computer readable storage medium that stores one or more programs (software modules) may be provided. One or more programs stored in the computer readable storage medium are configured for execution by one or more processors inside an electronic device. One or more programs include instructions for allowing the electronic device to execute methods according to the exemplary embodiments described in the claims and/or the specification of the present invention.

The program (software module, and software) may be stored in a random access memory, a non-volatile memory including a flash memory, Read Only Memory (ROM), Electrically Erasable Programmable Read Only Memory (EEPROM), a magnetic disc storage device, Compact Disc-ROM (CD-ROM), Digital Versatile Discs (DVDs) or other types of optical storage device, and a magnetic cassette. Alternatively, the program may be stored in a memory configured by a combination of all or a portion of these. Also, a plurality of memories may be provided.

Also, the program may be stored in an attachable storage device that can access a communication network such as the Internet, an Intranet, a Local Area Network (LAN), a Wide LAN (WLAN), and a Storage Area Network (SAN), or a network configured by a combination of these. The storage device may access a device that performs exemplary embodiments of the present invention via an external port. Also, a separate storage device on a communication network may access the device that performs exemplary embodiments of the present invention.

According to the present invention, a communication system detects an attempt to set an ill-intended DNS server and replaces it by a DNS server that is safe, so that a user may use the safe DNS server and personal information leakage is prevented.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a communication system, the method comprising:
   detecting, by a controller, an attempt to change a domain name system (DNS) server address from a first address that is in use for DNS query to a second address;
   determining, by the controller, whether the second address is included in a predetermined address list; and
   when the second address is not included in the predetermined address list, changing, by the controller, the first address to a third address that is selected based on a latency of each of at least one DNS server in the predetermined address list and a subscriber information of the terminal,
   wherein the subscriber information which is used for identifying a mobile network operator comprises mobile country code (MCC) information and mobile network code (MNC) information of the mobile network operator which provides a mobile communication service to the terminal, and
   wherein the latency of each of the at least one DNS server is a delay rate when each of the at least one DNS server processes the DNS query.

2. The method of claim 1, wherein the changed address is an address of, a DNS server providing a minimum latency among the at least one DNS server in the predetermined address list.

3. The method of claim 1, further comprising:
   when the second address is not included in the predetermined address list, outputting warning informing that a DNS server that uses the second address is not safe.

4. The method of claim 3, further comprising:
   when use of the second address is selected by a user input, after outputting the warning, changing the first address to the second address.

5. The method of claim 3, wherein the changing of the first address comprises:
   when the second address is selected not to be used, by a user input, after outputting the warning, changing the first address to the third address in the predetermined address list.

6. An apparatus of a terminal in a communication system, the apparatus comprising:

at least one processor; and a memory configured to store a module configured for being executable by the at least one processor, wherein the module comprises at least one instruction for detecting an attempt to change a domain name system (DNS) server address from a first address that is in use for DNS query to a second address, determining whether the second address is included in a predetermined address list, when the second address is not included in the predetermined address list, changing the first address to a third address that is selected based on a latency of each of at least one DNS server in the predetermined address list and a subscriber information of the terminal, wherein the subscriber information which is used for identifying a mobile network operator comprises mobile country code (MCC) information and mobile network code (MNC) information of the mobile network operator which provides a mobile communication service to the terminal, and wherein the latency of each of the at least one DNS server is a delay rate when each of the at least one DNS server processes the DNS query.

7. The apparatus of claim 6, wherein the changed address is an address of, a DNS server providing a minimum latency among the at least one DNS server in the predetermined address list.

8. The apparatus of claim 6, further comprising a display unit configured to display at least one of a number, a letter, and an image, wherein the module further comprises an instruction for, when the second address is not included in the predetermined address list, outputting warning informing that a DNS server that uses the second address is not safe.

9. The apparatus of claim 8, wherein the module further comprises an instruction for, when use of the second address is selected by a user input, after outputting the warning, changing the first address to the second address.

10. The apparatus of claim 8, wherein the module further comprises an instruction for, when the second address is selected not to be used, by a user input, after outputting the warning, changing the first address to the third address in the predetermined address list.

11. An apparatus of a terminal in a communication system, the apparatus comprising:

a memory; and at least one processor configured to detect an attempt to change a domain name system (DNS) server address from a first address that is in use for DNS query to a second address, determine whether the second address is included in a predetermined address list, when the second address is not included in the predetermined address list, change the first address to a third address that is selected based on a latency of each of at least one DNS server in the predetermined address list and a subscriber information of the terminal, wherein the subscriber information which is used for identifying a mobile network operator comprises mobile country code (MCC) information and mobile network code (MNC) information of the mobile network operator which provides a mobile communication service to the terminal, and wherein the latency of each of the at least one DNS server is a delay rate when each of the at least one DNS server processes the DNS query.

12. The apparatus of claim 11, wherein the changed address is an address of a DNS server providing a minimum latency among the at least one DNS server in the predetermined address list.

13. The apparatus of claim 11, further comprising a display unit configured to display at least one of a number, a letter, and an image, wherein, when the second address is not included in the predetermined address list, the at least one processor outputs a warning informing that a DNS server that uses the second address is not safe.

14. The apparatus of claim 13, wherein, when use of the second address is selected by a user input, after outputting the warning, the at least one processor changes the first address to the second address.

15. The apparatus of claim 13, wherein, when the second address is selected not to be used, by a user input, after outputting the warning, the at least one processor changes the first address to the third address in the predetermined address list.

* * * * *